US009792106B1

(12) United States Patent
Kommula et al.

(10) Patent No.: US 9,792,106 B1
(45) Date of Patent: Oct. 17, 2017

(54) TECHNIQUE FOR FAST NETWORK DEVICE CONFIGURATION UPGRADE AND RELOAD

(71) Applicant: Cisco Technology, Inc., San Jose, CA (US)

(72) Inventors: Raja Kommula, Cupertino, CA (US); Chickayya Naik, San Jose, CA (US); Naren Mididaddi, Saratoga, CA (US); Francesco Meo, Mountain View, CA (US); Sharanya Subramanian, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 154 days.

(21) Appl. No.: 14/450,935

(22) Filed: Aug. 4, 2014

(51) Int. Cl.
*G06F 9/445* (2006.01)
*G06F 1/24* (2006.01)
*G06F 9/44* (2006.01)
*H04L 12/24* (2006.01)

(52) U.S. Cl.
CPC ............... *G06F 8/65* (2013.01); *G06F 1/24* (2013.01); *G06F 9/4406* (2013.01); *H04L 41/082* (2013.01)

(58) Field of Classification Search
CPC .................................. G06F 8/67; H04L 45/00
See application file for complete search history.

(56) References Cited

U.S. PATENT DOCUMENTS

| | | | |
|---|---|---|---|
| 8,190,720 B1 | 5/2012 | Yellai et al. | |
| 8,799,419 B1* | 8/2014 | Lin | H04L 45/586 709/220 |
| 8,799,422 B1* | 8/2014 | Qu | H04L 45/00 709/220 |
| 2003/0033406 A1* | 2/2003 | John | H04L 12/2697 709/224 |
| 2005/0160417 A1* | 7/2005 | Kundetkar | G06F 17/30864 717/168 |
| 2007/0115967 A1* | 5/2007 | Vandenberghe | H04L 41/12 370/389 |

(Continued)

OTHER PUBLICATIONS

Cisco Systems, Inc., "Cisco IOS Software: Guide to Performing In-Service Software Upgrades",1992-2006, http://www.cisco.com/c/dam/en/us/products/collateral/ios-nx-os-software/high-availability/prod_white_paper0900aecd80456d57.pdf, 32 Pages.

*Primary Examiner* — Vivek Srivastava
*Assistant Examiner* — Sibte Bukhari
(74) *Attorney, Agent, or Firm* — Edell, Shapiro & Finnan, LLC

(57) ABSTRACT

A network device includes a control processor and a network processor unit (NPU) to forward network packets between network ports of the device. The processor downloads a new operating system (OS). The processor performs a fast upgrade to the new OS using a fast upgrade/reload technique to isolate the processor from interruptions and, without rebooting the processor, start the new OS in place of an existing OS. The fast upgrade/reload also includes delaying a reset of the NPU so that the NPU continues to route the network packets based on existing forwarding information. The fast upgrade/reload includes resetting the NPU only when the new OS first accesses the NPU, and then programming the reset NPU.

23 Claims, 5 Drawing Sheets

(56) References Cited

U.S. PATENT DOCUMENTS

| | | | |
|---|---|---|---|
| 2007/0159987 A1* | 7/2007 | Khan | H04L 45/00 370/256 |
| 2007/0162730 A1* | 7/2007 | Grandais | G06F 9/45512 713/1 |
| 2008/0019383 A1* | 1/2008 | Wainwright | H04L 12/4641 370/401 |
| 2009/0158266 A1* | 6/2009 | Celli | G06F 8/60 717/168 |
| 2010/0250908 A1* | 9/2010 | Amann | G06F 8/67 713/1 |
| 2013/0064102 A1* | 3/2013 | Chang | H04L 49/70 370/244 |

* cited by examiner

TECHNIQUE FOR FAST NETWORK DEVICE CONFIGURATION UPGRADE AND RELOAD

TECHNICAL FIELD

The present disclosure relates generally to upgrading a network device.

BACKGROUND

A layer-2/layer-3 (L2/L3) network switch routes data packets between other network devices connected with the switch, such as other switches and servers that host virtual machines. From time-to-time, the network switch is upgraded with a new operating system and other new configuration items, for example. Also, the network switch may need to perform a reboot or reset (referred to more generally as a "reload"). Typically, such an upgrade or reload may take an extended period of 5 to 10 minutes, during which time the network switch is unable to route packets. As a result, the network switch may lose connectivity with the other switches and the servers. The lost connectivity may cause existing communication links to be "torn-down" and the virtual machines to "crash." In large networks that employ thousands of network switches, problems associated with this extended period of lost connectivity causes large-scale network disruption, which frustrates network operators and users alike.

DESCRIPTION OF EXAMPLE EMBODIMENTS

Overview

According to the techniques presented herein, a network device performs an expedited or fast upgrade to a new operating system (OS) using a fast upgrade/reload technique. The network device includes a control processor and a network processor unit (NPU) to forward network packets between network ports of the network device based on forwarding information accessible to the NPU. While executing an existing OS used to control the network device, the processor downloads the new OS with which to upgrade the existing OS. The processor disables direct memory access (DMA) transfers, NPU access, and processor interrupts. Without being rebooted, the processor starts the new OS in place of the existing OS. The processor delays a reset of the NPU (i.e., holds-off on resetting the NPU) while the new OS is starting so that the NPU continues to route network packets based on existing forwarding information. The processor resets the NPU only when the new OS first requires access to the NPU. After resetting the NPU, the processor programs the NPU with new forwarding information.

Example Embodiments

Figure 1:
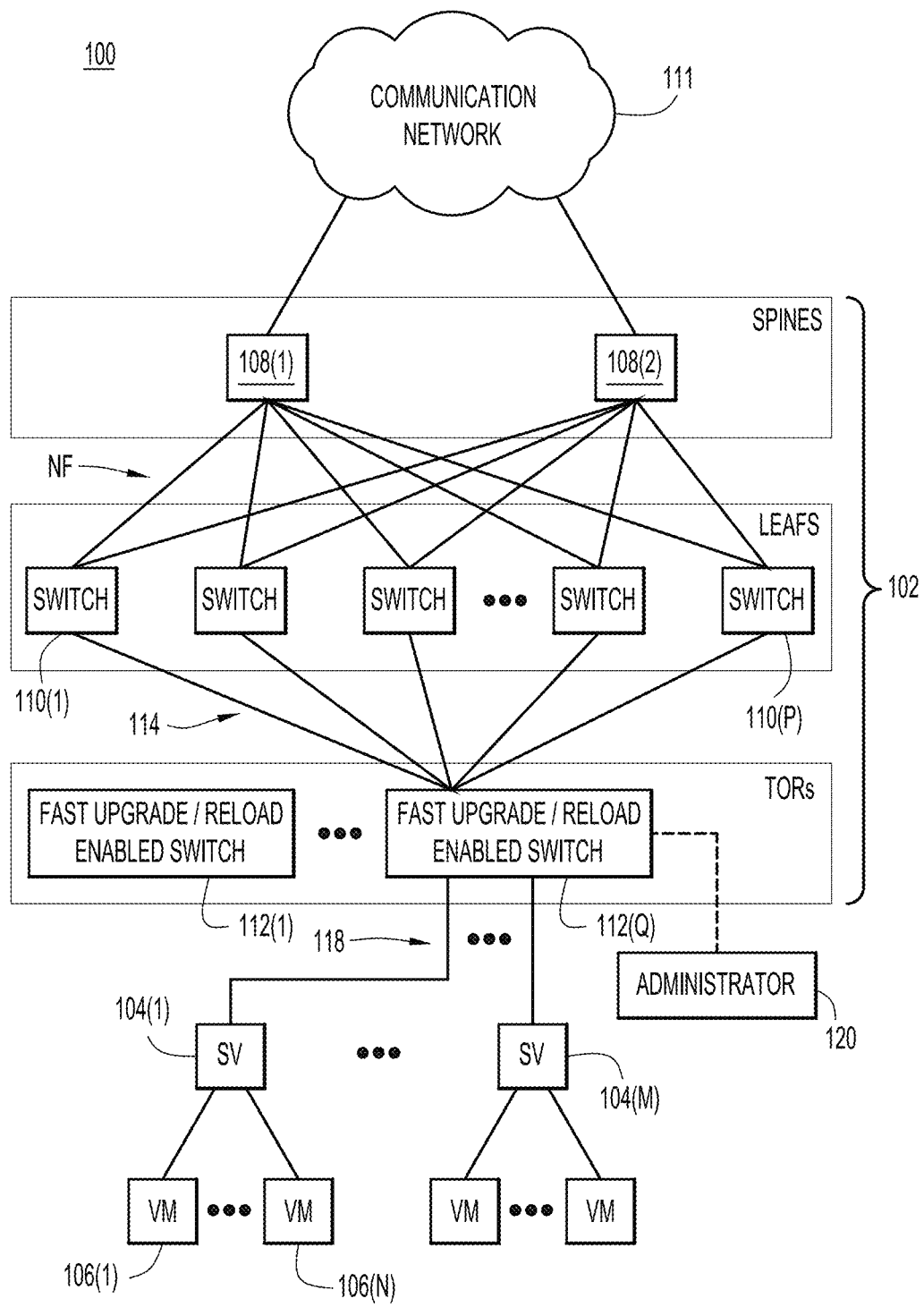
FIG. 1 is a block diagram of an example network environment in which techniques presented herein may be performed to perform an expedited or fast upgrade or reload (referred to more generally/collectively as a fast upgrade/reload) of a network device, according to an example embodiment.

Referring first to FIG. 1, there is shown a block diagram of an example network environment 100 in which techniques presented herein to perform an expedited or fast upgrade or reload (more generally, a "fast upgrade/reload") of a network device may be implemented. Network environment 100 includes a spine-leaf cluster network topology 102 coupled with multiple physical servers (SVs) 104(1)-104(M). Each of servers 104 may host multiple virtual machines (VMs) 106(1)-106(N).

Network topology 102 includes two spine switches 108(1) and 108(2) and multiple leaf switches 110(1)-110(P) connected to the spine switches by a network fabric NF. The network fabric NF may employ FabricPath technology of Cisco Systems, Inc. Each of leaf switches 110 is connected to each of spine switches 108 via network fabric NF. Spine switches 108 are each connected with a communication network 111. Communication network 111 may include one or more wide area networks (WANs), such as the Internet, and one or more local area networks (LANs).

Network topology 102 also includes multiple network devices 112(1)-112(Q). The ensuing description focuses on network device 112(Q), which is referred to simply as "network device 112." The description of network device 112 may be extended to each of the network devices 112(1)-112(Q). Network device 112 includes uplink network ports (not specifically shown in FIG. 1) connected to each of leaf switches 110(1)-110(P) through respective ones of communication links 114 (referred to as "uplinks"), and downlink network ports (not specifically shown in FIG. 1) connected to each of servers 104 through respective ones of communication links 118 (referred to as "downlinks"). Network device 112 may be a network switch (e.g., an L2/L3 switch), a router, a gateway, physical network interface card, and the like. Spine switches 108, leaf switches 110, and network device 112 each support functionality as defined by Open Systems Interconnection (OSI) model Layer 2 (L2) and/or Layer 3 (L3), and include switching and/or routing/forwarding capabilities. It should also be appreciated that the topology in FIG. 1 is shown merely as an example, and any number of combinations of physical servers, leaf switches, spine switches, and virtual machines may be present in network environment 100.

Network device 112 may interact with leaf switches 110(1)-110(P) across uplinks 114 using a variety uplink communication protocols including, but not limited to, the Link Aggregation Control Protocol (LACP), and the Border Gateway Protocol (BGP). For example, network device 112 and a "peer" among leaf switches 110(1)-110(P) may implement the Link Aggregation Control Protocol (LACP), i.e., exchange LACP packets or messages with each other, in order to bundle multiple uplink ports of the network device into a single communication link or logical channel between the network device and the peer. The aggregated communication link supports a higher bandwidth of network traffic than a communication link that is not aggregated.

Network device 112 also interacts with servers 104(1)-104(M) (and their hosted VMs) across downlinks 118 using a variety of second or downlink communication protocols including, but not limited to, the address resolution protocol or (ARP) to resolve network layer addresses, and the Internet Protocol (IP) version 6 (IPv6) neighbor discovery (ND) protocol to determine link-layer addresses of neighbors. An IPv6 ND protocol may include the Internet Control Message Protocol (ICMP), for example.

From time-to-time, each of the network devices 112(1)-112(Q) may perform an upgrade from an existing configuration item to a new configuration item. For example, a given network device 112 may upgrade from an existing operating system to a new operating system, i.e., install the new operating system as a replacement for the existing operating system. To reduce network interruption, it is desirable to reduce a time taken for an upgrade and a time during which the device is unable to switch/route data packets between peer devices during the upgrade. Also, from time-to-time, network device 112 may be booted-up/rebooted and/or reset without an upgrade; these processes are referred to generally herein as "reload." As with an upgrade, it is desirable to reduce a time taken for a reload.

To this end, techniques presented herein implement a fast upgrade or reload (more generally, a "fast upgrade/reload") in a network device that minimizes (i) a time taken to perform the upgrade/reload, e.g., install a new operating system or perform a reload, and (ii) a time that the network device is unable to switch network traffic during the upgrade/reload. A network device configured to support/perform the fast upgrade/reload technique is referred to as a "fast upgrade/reload enabled" or a "fast upgrade/reload compatible" network device. In other words, a fast upgrade/reload compatible network device uses the upgrade/reload technique presented herein to perform either a fast upgrade of its operating system or a fast reload (i.e., boot/reboot/reset).

In an upgrade example in which network device 112 is fast upgrade/reload compatible, the network device downloads a new operating system while the device executes an existing operating system that is to be replaced with the new operating system. Network device 112 may download the new operating system from an administrative server 120 (also referred to as an "administrator" 120) connected to communication network 111 or the network device directly and that provides overall management of network topology 102. Once network device 112 verifies that it is configured to perform a fast upgrade/reload (i.e., is fast upgrade/reload compatible), the device performs a fast upgrade/reload technique to install the downloaded new operating system in place of the existing operating system. In accordance with the fast upgrade/reload, network device 112 installs the new operating system in an expedited manner without a full reboot and power-cycle of processor systems and memory of the network device. Also, network device 112 delays a reset of packet forwarding functionality in the network device during the upgrade/reload for as long as possible so that the packet forwarding functionality is able to continue forward network packets even while the upgrade/reload is in process, so as to minimizes network disruption.

Figure 2:
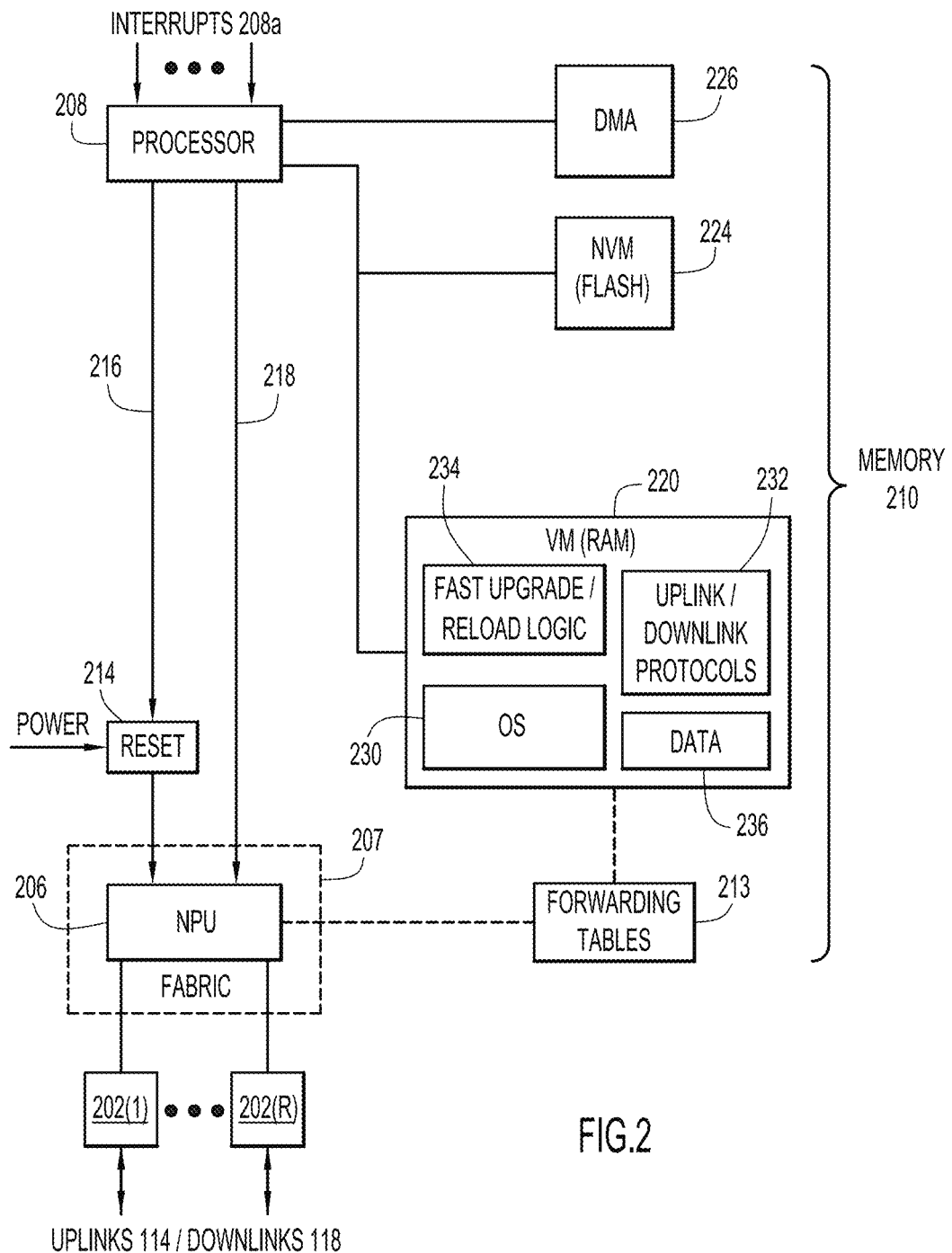
FIG. 2 is a block diagram of a network device in which fast upgrade/reload techniques presented herein may be performed, according to an example embodiment.

With reference to FIG. 2, there is depicted an example block diagram of network device 112 configured to perform the fast upgrade/reload techniques presented herein. The network device 112 includes a plurality of network ports 202(1)-202(R) (which may operate as uplink and downlink ports as described above) configured to receive data packets from other devices of a network and to send packets to the network, a network processor unit (NPU) 206 (which may be part of a switch fabric 207 that includes additional NPUs, not shown) for switching packets among the ports, a central processing unit (CPU) 208 (also referred to simply as a "processor" 208), and a memory 210. The processor 208 is, for example, a microprocessor or microcontroller that executes software instructions stored in the memory 210 to perform higher level control of the operations of the network device 112 and fast upgrade/reload techniques. The processor 208 is responsive to processor interrupts 208a from various components of the network device.

The NPU 206 forwards network data packets received at ingress ports among ports 202 and forwards the received packets to egress ports among ports 202 based on (i) forwarding information (e.g., L2/L3 routing information) stored in one or more forwarding tables 213 accessible to the NPU (e.g., stored in the NPU), and (ii) network address information extracted from the data packets to be forwarded. NPU 206 may be implemented in digital logic gates in one or more application specific integrated circuits (ASICs). Forwarding tables 213 may be stored in NPU 206, and may also be stored initially in memory 210 and copied to the NPU.

Network device 112 also includes NPU reset logic 214 that receives power for NPU 206 and selectively cycles power to the NPU responsive to NPU reset instructions from processor 208 over an interface 216. The processor 208 may also program, e.g., store information in, NPU 206 directly via an interface 218.

Memory 210 may comprise volatile memory (VM) and non-volatile memory (NVM) in various forms, including read only memory (ROM), random access memory (RAM) 220, magnetic disk storage media devices, optical storage media devices, flash memory devices 224, electrical, optical, or other physical/tangible memory storage devices, and fast RAM 226 to support direct memory access (DMA) features of memory 210. Thus, in general, the memory 210 may comprise one or more tangible (non-transitory) computer readable storage media (e.g., a memory device) encoded with software comprising computer executable instructions and when the software is executed (by the processor 208) it is operable to perform the techniques described herein. For example, memory 210 stores or is encoded with instructions for: an operating system 230 to perform overall operational control of network device 112; uplink and downlink communication protocols 232 implemented in association with peer devices across communication uplinks 114 and downlinks 118, respectively; and Fast Upgrade/Reload logic 234 to perform operations associated with the fast upgrade/reload techniques presented herein. Control and programming of NPU 206 may be shared across operating system 230 and Fast Upgrade/Reload logic 234. In addition, memory 210 stores data 236 used and generated by the processor 208 when executing the operating system 230, protocols 232, and logic 234.

Figure 3:
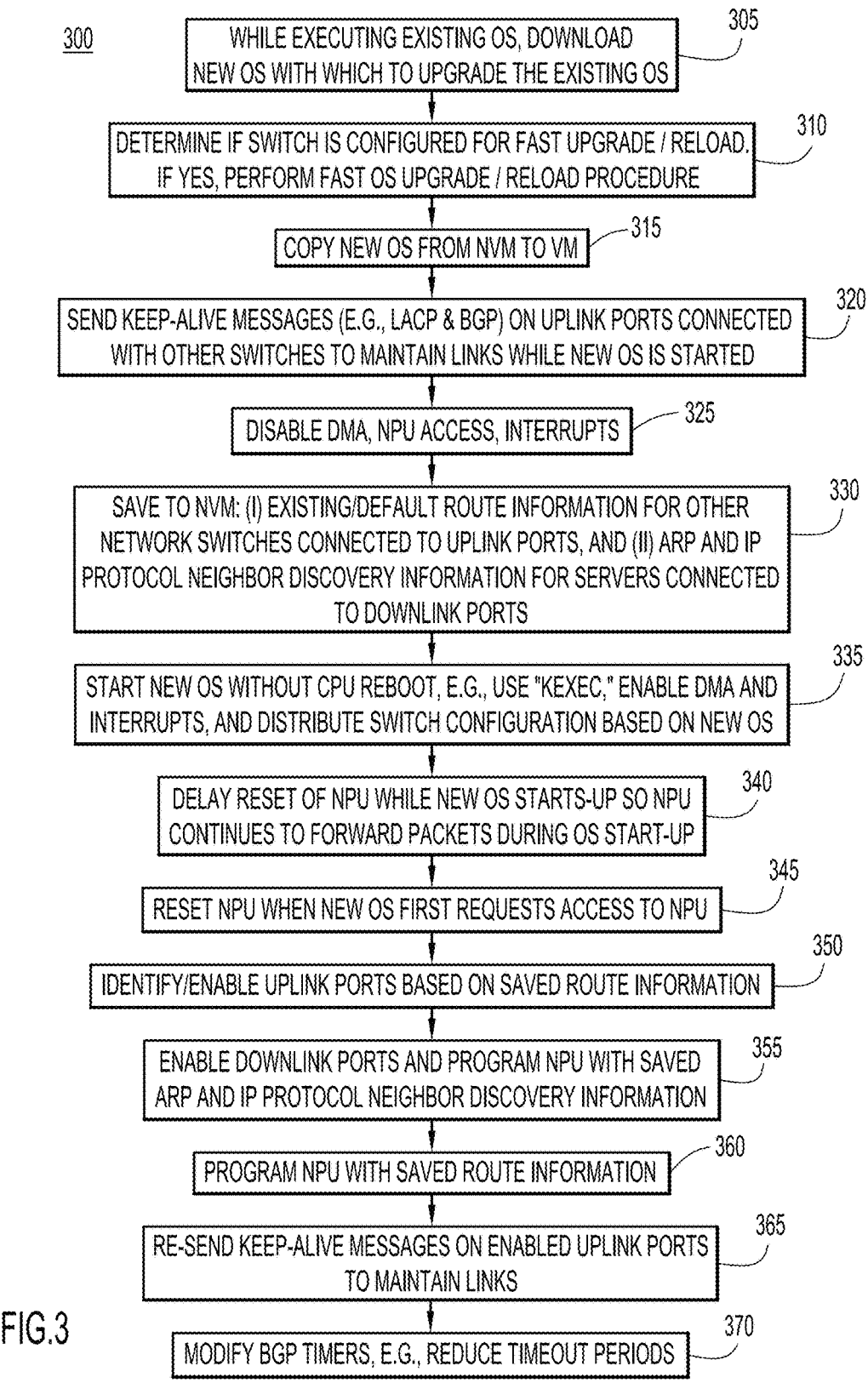
FIG. 3 is a flowchart of a method of performing a fast upgrade/reload associated with installing a new operating system in the network device, according to an example embodiment.

Turning now to FIG. 3, there is shown a flowchart of an example method 300 of performing a fast upgrade/reload when installing a new operating system in network device 112. Method 300 is performed by processor 208 executing Fast Upgrade/Reload logic 224. Reference is also made to FIG. 1 for purposes of the description of FIG. 3.

Initially, network device 112 is configured such that processor 208 executes an existing operating system (OS) that will be upgraded to/replaced by a new OS using a fast upgrade/reload as described below. Uplinks 114 have been established with leaf switches 110 connected with uplink ports among ports 202, and processor 208 executes uplink protocols (e.g., LACP and BGP) across the uplinks. Downlinks 118 have been established with serves 104 connected with downlink ports among ports 202, and processor 208 executed downlink protocols across the downlinks (e.g., ARP and IPv6 neighbor discovery protocols), as described above. NPU 206 forwards network packets received at ingress ports to egress ports among ports 202 (e.g., between various ones of the uplink and downlink ports) based on existing forwarding information stored in forwarding tables 213.

At 305, processor 208 downloads the new OS while executing the existing OS out of RAM 220. In an example, the new OS may be downloaded from administrator 120.

At 310, processor 208 determines if network device 112 is configured to support at least a fast upgrade/reload. To do this, processor 208 determines (i) if a configuration of network device 112 is fast upgrade/reload compatible, and (ii) if a runtime state of the network device is fast upgrade/reload compatible. If either test fails, processor 208 declares that network device 112 is not fast upgrade/reload compatible and sends a request to administrator 120 to remove the incompatible configuration and/or runtime state so that a fast upgrade/reload may be performed after the incompatible configuration and/or runtime state is removed by the administrator. Otherwise, processor 208 declares that network device 112 is fast upgrade/reload compatible, copies the downloaded new OS to flash memory 224, and operation proceeds to 315-370 to perform a fast upgrade/reload.

In an example, at operation 310, processor 208 determines if network device 112 implements either bidirectional forwarding detection (BFD) or the spanning tree protocol (STP), both or which are incompatible with the fast upgrade/reload. If processor 208 determines that network device 112 implements either BFD or STP, the processor declares that the network device is not fast upgrade/reload compatible. Otherwise, processor 208 copies the downloaded new OS to flash memory 224, and operation proceeds to 315-370.

At 315, processor 208 copies the new OS from flash memory 224 into RAM 220.

At 320, processor 208 sends communication protocol keep-alive messages to leaf switches 110(1)-110(P) over uplinks 114 to maintain the uplinks in an active state while the new operating is started (below). The keep-alive messages reset protocol timers on the links to prevent the timers from timing out during delays caused in the next operations. Example keep-alive messages include LACP "Hello" messages for the LACP protocols and BGP hand-shake messages for the BGP protocol.

At 325, processor 208 disables DMA operations, NPU access, and processor interrupts to isolate itself (the processor) from interrupts.

At 330, processor 208 saves to flash memory 224 existing and default forwarding (route) information stored in forwarding tables 213 associated with leaf switches 114 connected to the uplink ports; and ARP information and IPv6 ND information associated with servers 118 connected to the downlink ports.

At 335, processor 208 starts the new OS (i.e., processor 208 starts multiple OS processes that comprise the new OS) from RAM 220 without resetting, rebooting, or power-cycling either the processor or memory 210. In an example, processor 208 executes a process referred to as "kernel execution" or "kexec" to start the new OS. Kexec overwrites the existing OS executing in RAM 220 with the new OS and then starts executing the new OS from the RAM. Kexec performs functions in lieu of a boot loader, which would otherwise perform hardware initialization by network device firmware or Basic Input/Output System (BIOS). Thus, kexec avoids long delay times associated with a full boot-up of the new OS.

Also at 335, processor 208 enables DMA access and interrupts 212 (which were disabled at 325).

Also at 335, processor 208 configures various components of network switch 112. In one example, processor 208 parses and executes command line scripts to configure the components. In another example in which configuration information is available to processor 208 in the form of binary configuration files, the processor downloads the configuration information directly to the components in order to program/configure the components. The latter approach saves time over the former approach.

At 340, processor 208 delays a reset and reprogramming of NPU 206 while the processor starts the new OS at 335. This delay enables the NPU to operate normally to forward network packets based on existing forwarding information during the OS start-up. Processor 208 continues to delay the NPU reset until a first one of the new OS processes started at 335 requests access to NPU 206. The effect of operation 340 is to hold-off on resetting NPU 206 during the new OS start-up until a last possible moment so that the NPU can continue to forward packets as long as possible and thereby minimize network disruption.

At 345, processor 208 resets NPU 206 only when the started new OS first requests access to NPU 206. In an example, processor 208 power-cycles NPU 206 as part of the reset thereof.

At 350, processor 208 identifies uplink ports that need to be enabled based on the forwarding (route) information saved to flash memory 224 at operation 330, and then enables (i.e., turns on) the identified uplink ports.

At 355, processor 208 identifies and enables appropriate downlink ports based on the saved ARP information and IPv6 neighbor discovery information.

At 360, processor 208 programs NPU 206 with the saved forwarding information and any new forwarding information made available to the processor from the new OS. To program NPU 206, processor 208 may update forwarding tables 213 in RAM 220 and/or directly in NPU 206. Once programmed, NPU 206 forwards network packets based on the updated or new forwarding information.

At 365, processor 208 re-sends protocol keep-alive messages on uplinks 118 to maintain the links.

At 370, processor 208 may modify various protocol timers, e.g., BGP timers, to optimize subsequent operation of switch device 112. In an example, processor 208 reduces timeout periods of the BGP timers from first time periods set for subsequent OS upgrades performed without using the fast upgrade/reload process to second time periods set for the OS upgrades performed using the fast upgrade/reload process.

Operations 350-370 may be repeated multiple times until NPU/port configuration settles to a completed state.

The sequence and number of operations performed in method 400 may be varied in further arrangements of the fast upgrade/reload, as described below in connection with FIGS. 4 and 5.

Figure 4:
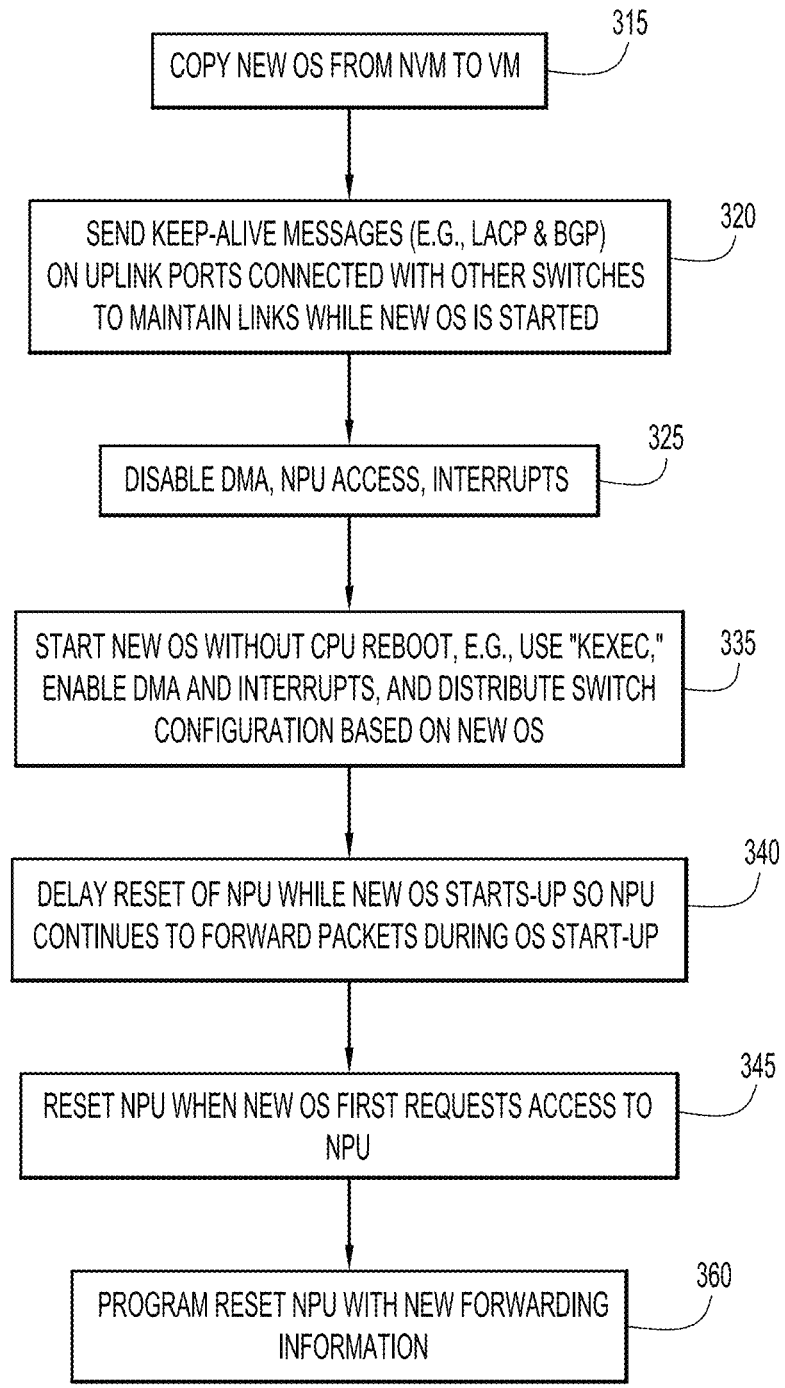
FIG. 4 is a flowchart of a first method of performing the fast upgrade/reload that includes a first subset of operations performed in the method of FIG. 3, according to an example embodiment.

With reference to FIG. 4, there is depicted a flowchart of an alternative method 400 of performing a fast upgrade/reload that includes a first subset of the operations performed in method 400. The first subset of operations includes operations 315, 320, 325, 335, 340, 345, and 360 and begins after processor 208 verifies fast upgrade/reload compatibility. With the exception of an NPU reset in operation 345, method 400 focuses primarily on operations associated with processor 208, including isolating the processor from interruptions during upgrade/reload, starting the new operating system, and keeping uplink protocols active.

At 315, processor 208 copies the new OS from flash memory 224 into RAM 220.

At 320, processor 208 sends communication protocol keep-alive messages to leaf switches 110(1)-110(P) over uplinks 114 to maintain the uplinks in an active state while the new operating is started.

At 325, processor 208 disables DMA operations, NPU access, and processor interrupts to isolate itself (the processor) from interruptions.

At 335, processor 208 (i) starts the new OS without resetting, rebooting, or power-cycling either the processor or memory 210, (ii) enables DMA access and interrupts 212, and (iii) configures various components of network switch 112 using binary configuration files.

At 340, processor 208 delays a reset and reprogramming of NPU 206 while the processor performs operation 335.

At 345, processor 208 resets NPU 206 only when the started new OS first requests access to NPU 206.

At 360, processor 208 programs NPU 206 with the saved forwarding information and any new forwarding information made available to the processor from the new OS.

Figure 5:
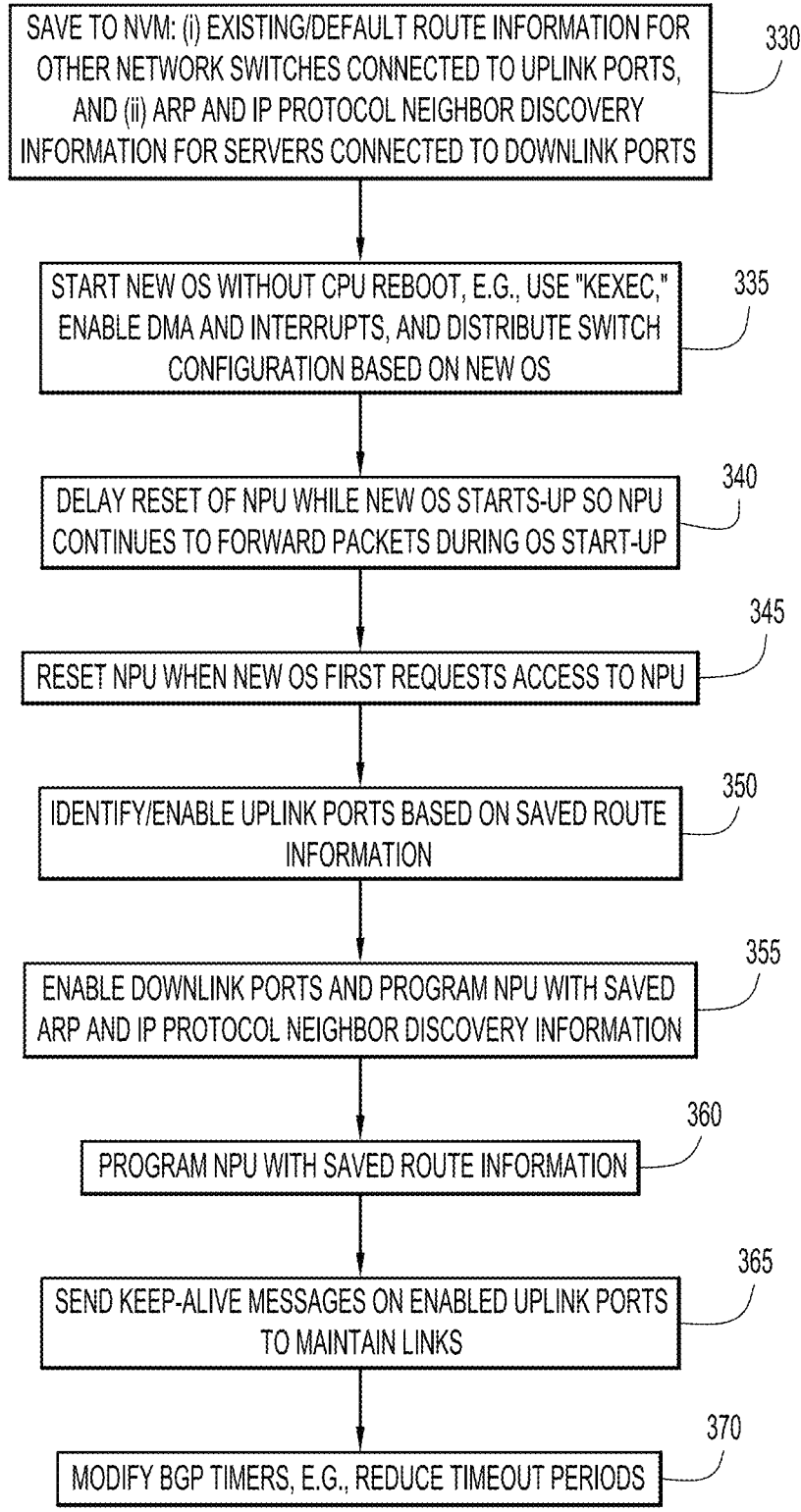
FIG. 5 is a flowchart of a second method of performing the fast upgrade/reload that includes a second subset of operations performed in the method of FIG. 3, according to an example embodiment.

With reference to FIG. 5, there is depicted a flowchart of a second method 500 of performing a fast upgrade/reload that includes a second subset of the operations performed in method 400. The second subset of operations includes operations 330, 335, 340, 345, 350, 355, 360, 365, and 370 and begins after processor 208 verifies fast upgrade/reload compatibility. Method 500 focuses primarily on operations performed by processor 208 with regard to NPU 206 and its connected network ports, and keeping uplink protocols active.

At 330, processor 208 saves to flash memory 224 existing and default forwarding (route) information stored, and ARP information and IPv6 ND information.

At 335, processor 208 (i) starts the new OS without resetting, rebooting, or power-cycling either the processor or memory 210, (ii) enables DMA access and interrupts 212, and (iii) configures various components of network switch 112 using binary configuration files.

At 340, processor 208 delays a reset and reprogramming of NPU 206 while the processor performs operation 335.

At 345, processor 208 resets NPU 206 only when the started new OS first requests access to NPU 206.

At 350, processor 208 identifies uplink ports that need to be enabled based on the forwarding (route) information saved to flash memory, and then enables (i.e., turns on) the identified uplink ports.

At 355, processor 208 identifies and enables appropriate downlink ports based on the saved ARP information and IPv6 neighbor discovery information.

At 360, processor 208 programs NPU 206 with the saved forwarding information and any new forwarding information made available to the processor from the new OS.

At 365, processor 208 sends protocol keep-alive messages on uplinks 118 to maintain the links.

At 370, processor 208 may modify various protocol timers, e.g., BGP timers, to optimize subsequent operation of switch device 112.

In summary, the foregoing presents techniques to perform a fast upgrade/reload of a network device, such as a network switch. The fast upgrade/reload reduces a time taken to perform the upgrade/reload and also reduces a time that the switch is unable to route packets during the upgrade/reload (i.e., the fast upgrade/reload maximizes the time that the switch is able to route packets during the upgrade/reload). In an example, the fast upgrade/reload upgrades the network device to a new operating system (e.g., a new version of an operating system) without resetting, re-booting, or power-cycling a control processor or memory of the network device. Also, the control processor delays a reset of the NPU in the network device while the new operating system is started up until a first time that the new operating system requires access to the NPU. This delay permits the NPU to continue forwarding network packets for as long as possible during the OS upgrade. In an example, the fast upgrade/reload technique has been shown to reduce operating system upgrade times from 5 minutes down to 80-90 seconds. In this example, the NPU downtime throughout the fast upgrade/reload (i.e., the time taken from operations 345-360 of method 300) has been shown to be under 25 seconds, which means that network interruption is less than 25 seconds. In another example, a fast reboot after a configuration change (e.g., an ACL table size change, or a port speed change) reduces a conventional boot time from between 5-10 minutes down to 20-25 seconds. In another example, if a "software bug" causes network device software to malfunction, the network device may be re-booted/reset quickly using the fast upgrade/reload technique.

In summary, in one form, a method is provided comprising: while executing an existing operating system used to control a network device, downloading a new operating system with which to upgrade the existing operating system; disabling direct memory access transfers, access to a network processor unit (NPU) of the network device, and interrupts of a processor of the network device; without rebooting the processor, starting the new operating system in place of the existing operating system; delaying a reset of the NPU while the new operating system is starting so that the NPU continues to route the network packets based on existing forwarding information; resetting the NPU when the new operating system first accesses the NPU; and after resetting the NPU, programming the NPU with new forwarding information.

In summary, in another form, an apparatus is provided comprising: a plurality of ports to receive packets from a network and to output packets to the network; a network processor unit (NPU) connected with the ports to forward the packets between the ports based on forwarding information accessible to the NPU; a processor coupled with the NPU, wherein the processor: while executing an existing operating system used to control the apparatus, downloads a new operating system with which to upgrade the existing operating system; disables direct memory access transfers, NPU access, and processor interrupts; without rebooting the processor, starts the new operating system in place of the existing operating system; delays a reset of the NPU while the new operating system is starting so that the NPU continues to route the network packets based on existing forwarding information; resets the NPU only when the new operating system first accesses the NPU; and after resetting the NPU, programs the NPU with new forwarding information.

In summary, in yet another form, a processor readable medium is provided. The processor readable medium stores instructions that, when executed by a processor of a network device that includes a network processor unit (NPU) configured to forward network packets between network ports of the network device using forwarding information accessible to the NPU, cause the processor to: while executing an existing operating system used to control the network device, download a new operating system with which to upgrade the existing operating system; disable direct memory access transfers, NPU access, and processor interrupts; without rebooting the processor, starting the new operating system in place of the existing operating system; delay a reset of the NPU while the new operating system is starting so that the NPU continues to route the network packets based on existing forwarding information; reset the NPU only when the new operating system first access the NPU; and after resetting the NPU, program the NPU with new forwarding information.

The above description is intended by way of example only.

What is claimed is:

1. A method comprising:
at a processor of a network device having a network processor unit (NPU) coupled to the processor and to network ports of the network device, the NPU configured to forward network packets between the network ports using forwarding information accessible to the NPU:
while executing an existing operating system used to control the network device, downloading a new operating system with which to upgrade the existing operating system and update the NPU with new forwarding information from the new operating system;
before starting the new operating system, saving existing forwarding information associated with network switches connected to the network device;
disabling direct memory access transfers, access to the NPU, and interrupts with respect to the processor;
without rebooting the processor, overwriting the existing operating system with the new operating system and starting the new operating system in place of the existing operating system;
delaying a reset of the NPU while multiple new operating system processes are starting until after a first of the multiple new operating system processes requests to access the NPU so that the NPU continues to route the network packets based on existing forwarding information;
resetting the NPU after the first of the multiple new operating system processes requests to access the NPU; and
after resetting the NPU:
programming the NPU with the new forwarding information;
identifying uplink ports of the network device based on the saved forwarding information and enabling the identified uplink ports; and
programming the NPU with the saved forwarding information.

2. The method of claim 1, further comprising:
before starting the new operating system, saving address resolution protocol information and Internet Protocol (IP) neighbor discovery information associated with servers that host virtual machines and are connected to the network device; and
after enabling the uplink ports:
enabling downlink ports of the network device; and
programming the NPU with the saved address resolution protocol information and IP neighbor discovery information.

3. The method of claim 1, further comprising:
before starting the new operating system, sending communication protocol keep-alive messages to the network switches to maintain communication links with the network switches while the new operating system is starting; and
after enabling the uplink ports, resending the communication protocol keep-alive messages to the network switches to maintain communication links with the network switches.

4. The method of claim 3, further comprising:
before starting the new operating system, using a link aggregation control protocol (LACP) to bundle multiple ones of the uplink ports into an aggregated communication link and implementing a border gateway protocol (BGP) across the link,
wherein the sending communication protocol keep-alive messages includes sending LACP and BGP keep alive messages.

5. The method of claim 4, further comprising: after the new operating system has started, shortening BGP protocol timer timeout periods.

6. The method of claim 1, wherein:
the starting the new operating system includes starting multiple new operating system processes and enabling direct memory access and processor interrupts; and
the resetting includes power-cycling the NPU.

7. The method of claim 6, further comprising:
after the new operating system has started, distributing binary configuration files to components of the network device to configure the components based on the new operating system instead of executing command line scripts to configure the components.

8. The method of claim 1, further comprising:
determining whether the network device is configured to support a fast upgrade/reload of the existing operating system with the new operating system, wherein the fast upgrade/reload includes the starting, the delaying, the resetting and the programming;
if it is determined that the network device is configured to support the fast upgrade/reload, copying the downloaded new operating system from volatile memory to non-volatile memory;
receiving a fast upgrade/reload command to initiate the fast upgrade/reload;
copying the new operating system from non-volatile memory to volatile memory so as to overwrite the existing operating system stored therein; and
performing the fast upgrade/reload.

9. The method of claim 8, wherein:
the determining includes determining if the network device implements either bidirectional forwarding detection (BFD) or a spanning tree protocol (STP); and
if it is determined that the network device does not implement either of BFD or the STP, declaring that the network device is configured to support the fast upgrade/reload; and
if it is determined that the network device does implement either of BFD or the STP, declaring that the network device is not configured to support the fast upgrade/reload.

10. The method of claim 1, wherein resetting the NPU includes power-cycling the NPU.

11. An apparatus comprising:
a plurality of ports to receive packets from a network and to output packets to the network;
a network processor unit (NPU) connected with the ports to forward the packets between the ports based on forwarding information accessible to the NPU;

a processor coupled with the NPU, wherein the processor is configured to:
  while executing an existing operating system used to control the apparatus, download a new operating system with which to upgrade the existing operating system and update the NPU with new forwarding information from the new operating system;
  before starting the new operating system, save existing forwarding information associated with network switches connected to the network device;
  disable direct memory access transfers, NPU access, and processor interrupts;
  without rebooting the processor, overwrite the existing operating system with the new operating system and start the new operating system in place of the existing operating system;
  delay a reset of the NPU while multiple new operating system processes are starting until after a first of the multiple new operating system processes requests to access the NPU so that the NPU continues to route the network packets based on existing forwarding information;
  reset the NPU after the first of the multiple new operating system processes requests to access the NPU; and
  after resetting the NPU:
    program the NPU with the new forwarding information;
    identify uplink ports of the network device based on the saved forwarding information and enable the identified uplink ports; and
    program the NPU with the saved forwarding information.

12. The apparatus of claim 11, wherein the processor is further configured to:
  before starting the new operating system, save address resolution protocol information and Internet Protocol (IP) neighbor discovery information associated with servers that host virtual machines and are connected to the network device; and
  after enabling the uplink ports:
    enable downlink ports of the network device; and
    program the NPU with the saved address resolution protocol information and IP neighbor discovery information.

13. The apparatus of claim 11, wherein the processor is further configured to:
  before starting the new operating system, send communication protocol keep-alive messages to the network switches to maintain communication links with the network switches while the new operating system is starting; and
  after enabling the uplink ports, resend the communication protocol keep-alive messages to the network switches to maintain communication links with the network switches.

14. The apparatus of claim 13, wherein the processor is further configured to:
  before starting the new operating system, use a link aggregation control protocol (LACP) to bundle multiple ones of the uplink ports into an aggregated communication link and implement a border gateway protocol (BGP) across the link,
  wherein the processor is configured to send communication protocol keep-alive messages by sending LACP and BGP keep alive messages.

15. The apparatus of claim 11, wherein the processor is configured to:
  start the new operating system by starting multiple new operating system processes and enabling direct memory access and processor interrupts; and
  reset the NPU by power-cycling the NPU.

16. The apparatus of claim 11, wherein the processor is further configured to:
  determine whether the network device is configured to support a fast upgrade/reload of the existing operating system with the new operating system, wherein the fast upgrade/reload includes the operations to start, delay, reset and program;
  if it is determined that the network device is configured to support the fast upgrade/reload, copy the downloaded new operating system from volatile memory to non-volatile memory;
  receive a fast upgrade/reload command to initiate the fast upgrade/reload;
  copy the new operating system from non-volatile memory to volatile memory so as to overwrite the existing operating system stored therein; and
  perform the fast upgrade/reload.

17. The apparatus of claim 16, wherein the processor is further configured to:
  determine by determining if the network device implements either bidirectional forwarding detection (BFD) or a spanning tree protocol (STP); and
  if it is determined that the network device does not implement either of BFD or the STP, declare that the network device is configured to support the fast upgrade/reload; and
  if it is determined that the network device does implement either of BFD or the STP, declare that the network device is not configured to support the fast upgrade/reload.

18. A non-transitory computer readable storage media encoded with instructions that, when executed by a processor of a network device that includes a network processor unit (NPU) configured to forward network packets between network ports of the network device using forwarding information accessible to the NPU, cause the processor to:
  while executing an existing operating system used to control the network device, download a new operating system with which to upgrade the existing operating system and update the NPU with new forwarding information from the new operating system;
  before starting the new operating system, save existing forwarding information associated with network switches connected to the network device;
  disable direct memory access transfers, NPU access, and processor interrupts;
  without rebooting the processor, overwrite the existing operating system with the new operating system and start the new operating system in place of the existing operating system;
  delay a reset of the NPU while multiple new operating system processes are starting until after a first of the multiple new operating system processes requests to access the NPU so that the NPU continues to route the network packets based on existing forwarding information;
  reset the NPU after the first of the multiple new operating system processes requests to access the NPU; and
  after resetting the NPU:
    program the NPU with the new forwarding information;

identify uplink ports of the network device based on the saved forwarding information and enable the identified uplink ports; and program the NPU with the saved forwarding information.

19. The computer readable storage media of claim 18, further comprising instructions to cause the processor to:

before starting the new operating system, save address resolution protocol information and Internet Protocol (IP) neighbor discovery information associated with servers that host virtual machines and are connected to the network device; and after enabling the uplink ports:
enable downlink ports of the network device; and
program the NPU with the saved address resolution protocol information and IP neighbor discovery information.

20. The computer readable storage media of claim 18, further comprising instructions to cause the processor to:

before starting the new operating system, send communication protocol keep-alive messages to the network switches to maintain communication links with the network switches while the new operating system is starting; and after enabling the uplink ports, resend the communication protocol keep-alive messages to the network switches to maintain communication links with the network switches.

21. The computer readable storage media of claim 20, further comprising instructions to cause the processor to:

before starting the new operating system, use a link aggregation control protocol (LACP) to bundle multiple ones of the uplink ports into an aggregated communication link and implement a border gateway protocol (BGP) across the link, wherein the instructions to cause the processor to send include instructions to cause the processor to send communication protocol keep-alive messages by sending LACP and BGP keep alive messages.

22. The computer readable storage media of claim 18, further comprising instructions to cause the processor to:

start the new operating system by starting multiple new operating system processes and enabling direct memory access and processor interrupts; and reset the NPU by power-cycling the NPU.

23. The computer readable storage media of claim 18, further comprising instructions to cause the processor to:

determine whether the network device is configured to support a fast upgrade/reload of the existing operating system with the new operating system, wherein the fast upgrade/reload includes the operations to start, delay, reset and program;

if it is determined that the network device is configured to support the fast upgrade/reload, copy the downloaded new operating system from volatile memory to non-volatile memory;

receive a fast upgrade/reload command to initiate the fast upgrade/reload;

copy the new operating system from non-volatile memory to volatile memory so as to overwrite the existing operating system stored therein; and perform the fast upgrade/reload.

\* \* \* \* \*